No. 647,699. Patented Apr. 17, 1900.
A. C. HACHFIELD.
NUT.
(Application filed July 31, 1899.)
(No Model.)

UNITED STATES PATENT OFFICE.

AUGUST C. HACHFIELD, OF MILWAUKEE, WISCONSIN, ASSIGNOR TO HUGO H. CASPER, OF SAME PLACE.

NUT.

SPECIFICATION forming part of Letters Patent No. 647,699, dated April 17, 1900.

Application filed July 31, 1899. Serial No. 725,628. (No model.)

*To all whom it may concern:*

Be it known that I, AUGUST C. HACHFIELD, a citizen of the United States, and a resident of Milwaukee, in the county of Milwaukee and State of Wisconsin, have invented certain new and useful Improvements in Nuts; and I do hereby declare that the following is a full, clear, and exact description thereof.

My invention has for its object to prevent automatic loosening of nuts tightened on bolts against opposing surface; also, to avoid abrasion of said surface by nut-corners and to insure tightening of said nuts on deflected bolts without damage to the same. Hence said invention consists in a nut having the peculiarity of construction hereinafter particularly set forth with reference to the accompanying drawings and subsequently claimed.

Figure 1:
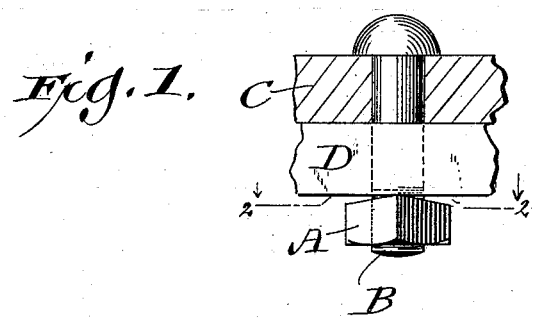
Figure 2:
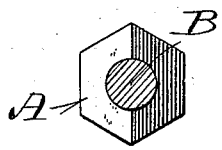

Figure 1 of the drawings represents an elevation of my improved nut tightened on a bolt against an opposing surface, and Fig. 2 a partly-sectional plan view on the plane indicated by line 2 2 in the preceding figure.

Referring by letter to the drawings, A indicates my improved nut run on a bolt B, that extends through two thicknesses C D of metal or other material. The nut differs from those of ordinary construction in that its working face is beveled in opposite directions from a central line, this line being preferably the greatest diameter of said nut. The nut being tightened on the bolt aforesaid, it will readily seat on the opposing surface, owing to strain against the transverse edge presented at its greatest depth in opposite directions from the bolt-aperture, and this seating of said nut secures it against the forces that usually tend to loosen nuts of the ordinary construction. The transverse working-face edge being at the greatest depth of the nut and radial of the same in opposite directions from the bolt-aperture, said nut will readily slip upon opposing surface when turned in either direction on the bolt while in contact with said surface, and thus abrasion of this surface by nut-corners is avoided.

In case of a deflected bolt my peculiarity of improved nut permits of its automatic inclination to greatest lean of said bolt when tightened thereon against opposing surface, and it has been found by experiment that a nut of the kind herein set forth tends to automatically tighten on a deflected bolt incidental to vibration or other causes having a tendency to loosen an ordinary nut under similar conditions.

From the foregoing it will be understood that nuts similar to the one herein set forth automatically compensate for irregularities or inclinations of opposing contact-surfaces and overcome the difficulties usually experienced with nuts of the ordinary construction, these nuts of common knowledge being seldom, if ever, true upon their working faces.

Having thus described my invention, what I claim as new, and desire to secure by Letters Patent, is—

1. A nut having its working face beveled in opposite directions from a diameter thereof to thereby form a transverse edge at its greatest depth in opposite directions from its bolt-aperture.

2. A nut having its working face beveled in opposite directions from its greatest diameter to thereby form a transverse edge at its greatest depth in opposite directions from its bolt-aperture.

In testimony that I claim the foregoing I have hereunto set my hand, at Milwaukee, in the county of Milwaukee and State of Wisconsin, in the presence of two witnesses.

A. C. HACHFIELD.

Witnesses:
N. E. OLIPHANT,
WM. H. CASPER.